# UNITED STATES PATENT OFFICE.

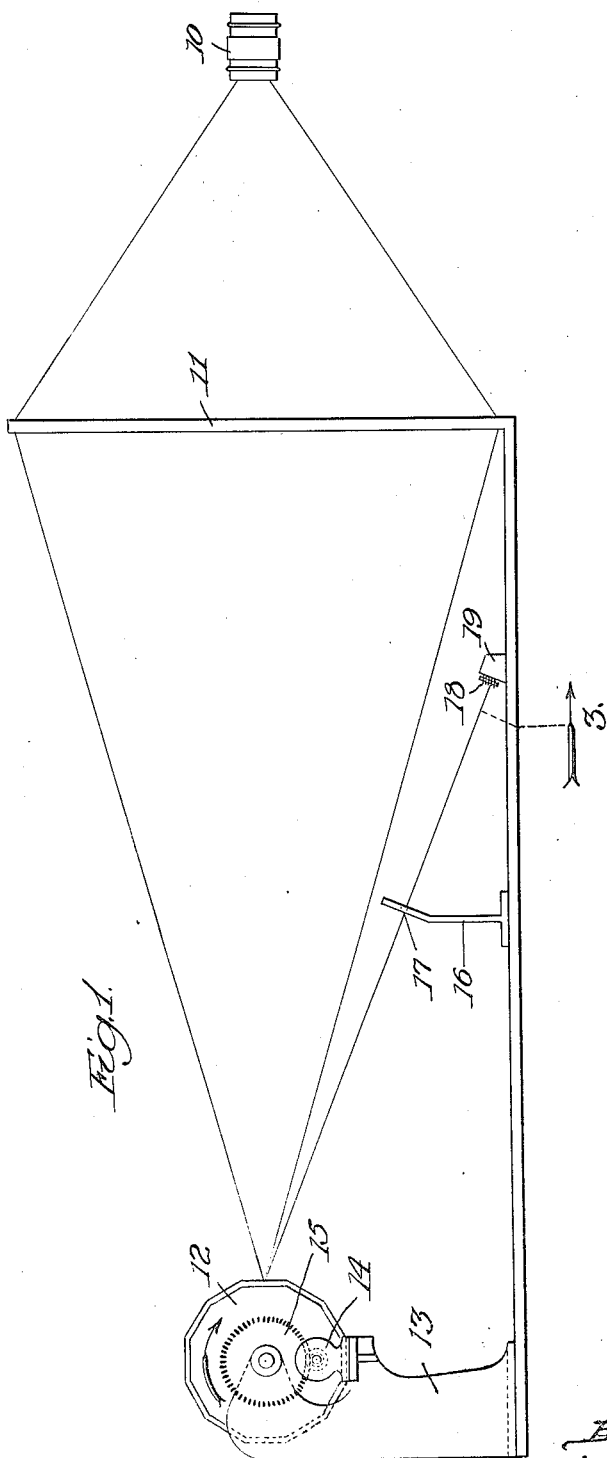
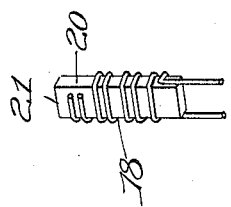
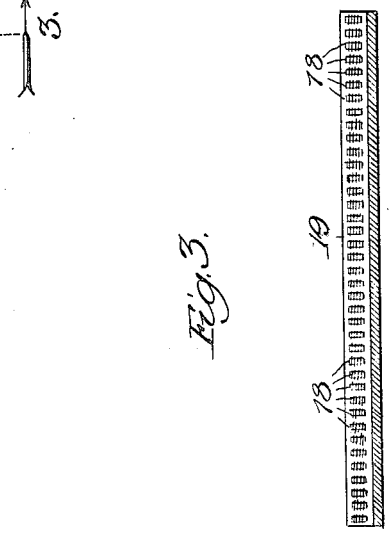

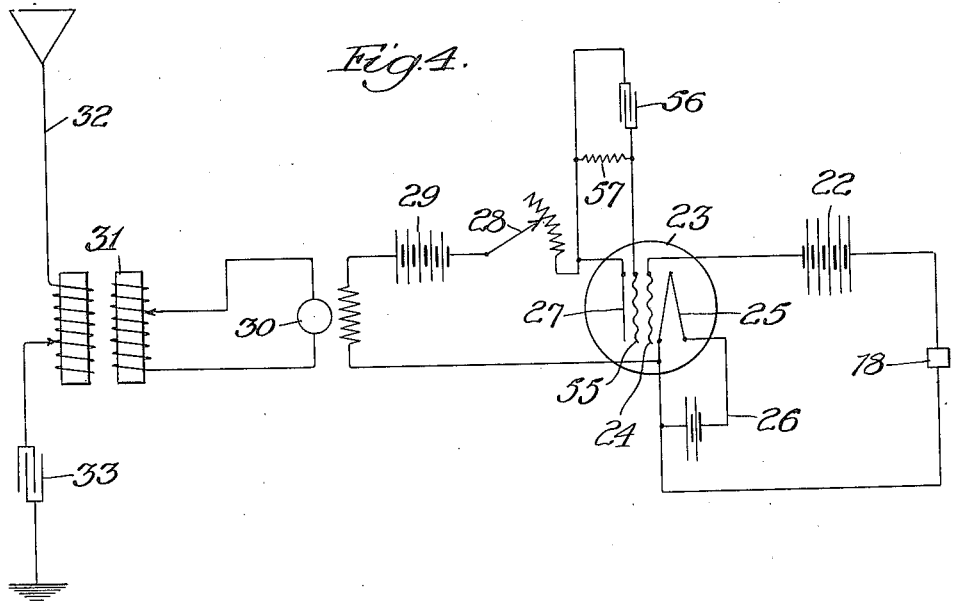
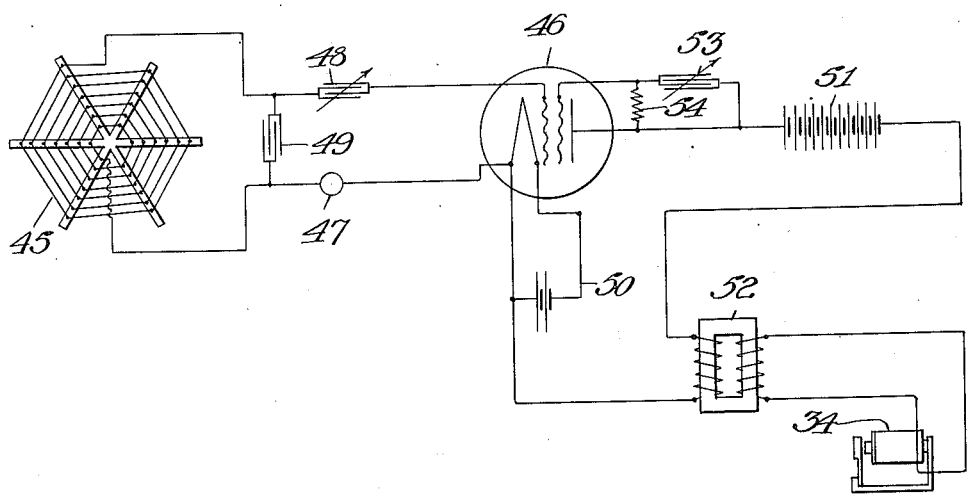

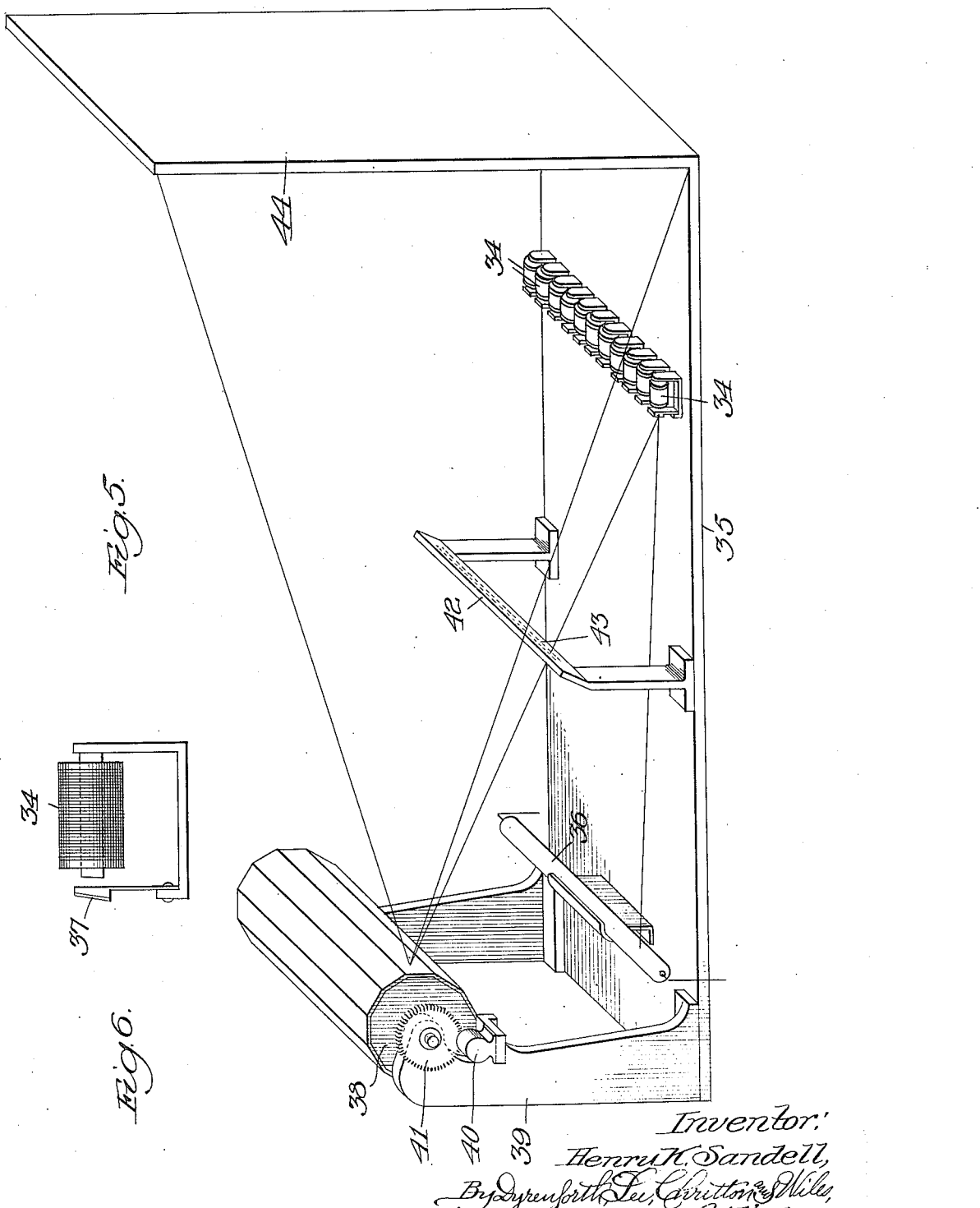

HENRY K. SANDELL, OF CHICAGO, ILLINOIS, ASSIGNOR TO HERBERT S. MILLS, OF CHICAGO, ILLINOIS.

ART OF TRANSMITTING PICTURES AND THE LIKE.

1,423,737. Specification of Letters Patent. Patented July 25, 1922.

Application filed September 10, 1919. Serial No. 322,815.

*To all whom it may concern:*

Be it known that I, HENRY K. SANDELL, a citizen of the United States, residing at Chicago, in the county of Cook and State of Illinois, have invented a new and useful Improvement in the Art of Transmitting Pictures and the like, of which the following is a specification.

The present invention relates to the transmission by electro-magnetic means of pictures, designs, or the like, and more particularly to the reproduction at a distance of pictures, scenes or designs in such manner that the reproduced image will present to the eye of an observer the variations in form, movement and the like of the original picture, scene or design.

In carrying out the present invention, definite areas of an illuminated picture, scene or the like, displayed upon a substantially plane surface and in motion or at rest are progressively and in succession projected upon a device sensitive to light so that in a given period of time the entire area of the illuminated picture or the like has been projected upon said light-sensitive devices. The projection of this progressive succession of areas of the original picture is repeated at exceedingly short intervals of time. The light sensitive devices are caused by electro-magnetic or other means to actuate light projecting mechanism at a distance which effect the projection of areas of light similar to or identical with the definite areas of the original, which areas are received upon a screen in a progressive succession, likewise repeated at exceedingly short intervals of time and. thereby producing upon said screen a semblance of the original picture, this semblance or image partaking of any variations, changes or movements in the original.

In the accompanying drawings are illustrated specific means whereby the present invention may be carried out. In these drawings, Figure 1 is a side elevation of means for sending or transmitting the pictures, designs or the like;

Fig. 2 is a perspective view of a light-sensitive selenium cell as utilized in said sending device;

Fig. 3 shows a vertical elevation of the banks of light-sensitive devices or selenium cells in the sending device;

Fig. 4 is a diagrammatic representation of an electro-magnetic circuit, such as is actuated by each of the light-sensitive devices of the sending apparatus;

Fig. 5 is a view in perspective of the receiving mechanism;

Fig. 6 is a side elevation of one of the light-projecting mechanisms of the receiving apparatus, and Fig. 7 is a diagrammatic illustration of an electro-magnetic circuit capable of receiving impulses from the sending apparatus and transmitting them to an individual projecting device of the repeating apparatus.

In the sending apparatus as illustrated in Fig. 1 of the drawings, the picture to be transmitted is projected by means of a suitable optical lens 10 upon a transparency 11, preferably vertically disposed. The term picture as used herein is intended to include actual landscapes, scenes, animate or inanimate objects or depictions thereof, or designs or illustrations or, broadly any optical effect. The transparency 11 may suitably be of ground glass.

On the opposite side of the transparency 11 and spaced therefrom is a mirror prism 12, rotatably mounted and in the embodiment illustrated, having 12 sides, each a mirror surface. In the specific embodiment illustrated the mirror prism is mounted horizontally upon a suitable standard 13 and the axis of the prism is parallel to the plane of the transparency 11. Rotation of the mirror prism 12 is effected, for example, by means of a suitable motor 14, likewise mounted on standard 13, the armature shaft of which engages gear 15 mounted on the prism. Between the prism 12 and the transparency 11 is mounted a screen 16 which is not of sufficient height to intercept rays of light passing from the base of the transparency 11 to the prism 12. The screen 16 is provided with a limiting slot 17, of relatively narrow width (approximately ¼ inch) through which rays of light reflected from the mirror may pass to a bank of selenium cells or other suitable light responsive devices 18 mounted upon a suitable support 19.

In Fig. 2 a suitable construction of selenium cell is illustrated, the cell consisting of a small block of insulating material 20 coated on one face 21 with selenium and wound with two spaced, uncovered, unconnected conductor wires 22 and 23. The projection of rays of light upon the selenium-coated face of the cell increases the conductivity of the coating and accordingly permits the passage of an electrical current from one of the spaced conductors to the other, the strength of the current varying with the strength of the light rays falling upon the device.

The operation of the sending or transmitting apparatus is as follows:

A picture being projected upon the transparency 11, for example, by means of the lens 10, the mirror prism 12 is rotated so as to produce a rapid progression of its mirror faces before the screen. For example, with a dodecagonal prism as illustrated in the drawings, the prism may be rotated at the rate of 100 revolutions per minute, as a result of which 1200 mirror faces will be presented before the transparency per minute. If the prism is caused to rotate in the direction of the arrow shown on Fig. 1 so that the mirror faces opposite the transparency 11 move from the top downwardly, each mirror face will in its movement reflect through the slot 17 in the screen 16 the entire picture or image shown on the transparency the image on the transparency being reflected as a continuous succession of transversely divided, parallel areas beginning with the top portion of the image on the transparency 11 and passing down to the bottom portion of the image. Hence each mirror face of the rotating prism 12 causes the entire image and the transparency 11 to be reflected against the banks of selenium cells 18 once during each rotation of the prism. The strength of illumination of any point on the transparency 11 thus has its effect upon the selenium cell once during the passage of each face of the prism before the transparency, and this degree of illumination produces a varying degree of conductivity of the selenium cell, which in turn is caused to produce a definite effect at a distance by electro-magnetic means, for example, as illustrated in Fig. 4.

In accordance with the method of transmission illustrated in Fig. 4, each selenium cell is connected in the grid circuit of a thermionic amplifier 23, together with a source of current 22. The amplifier circuit illustrated is of the regenerative type described in the application of the present applicant filed Aug. 28, 1919, No. 320,500. Within the amplifier the circuit of the selenium cell 18 is completed between the grid 24 and the heated filament 25, the filament being heated by means of battery 26. The plate surface between filament 25 and plate 27 within the amplifier is completed through variable resistance 28, current source 29 and the field of a high frequency alternator 30. The supplemental grid 55 is connected across condenser 53 with the plate circuit, a high resistance leak 57 being shunted across the condenser. The high frequency current generated by the alternator 30 passes through the primary of a transformer 31, the secondary of which is connected upon the one hand to an aerial 32 and upon the other hand through a condenser 33 to the ground. Each of the selenium cells of the bank of cells 18 of the sending apparatus is connected with a separate aerial of different characteristics so that the Hertzian waves transmitted are each of different amplitude. It is hence apparent that by proper adjustment of the receiving mechanism, the waves initiated by the passage of current through the individual selenium cells may be separately received and transmitted to a suitable projecting mechanism for the reproduction of the transmitted image.

The electro-magnetic impulses due to the action of the selenium cells of the sending device may be suitably received and converted into a composite illuminated image or picture by the means illustrated in Fig. 5. In this device a bank of electro-magnets 34 is placed side by side upon a suitable standard or support 35. Each of these electro-magnets is arranged in a position upon the support corresponding to the position of one of the selenium cells 18 of the sending device, the number of electro-magnets and their relative position being the same as those of the selenium cells. The armatures of the electro-magnets are directed toward a source of light 36 and each electro-magnet armature is provided with a small mirror surface 37 disposed at a slight angle from the vertical in order to reflect light from the source of light 36 back to a point somewhat above the source of light as hereinafter more fully explained.

Somewhat above the source of light 36 is arranged a mirror prism 38, the position of which corresponds to the position of the mirror prism 12 of the sending apparatus upon its standard. This prism 38 is constructed with the same number of sides, each of which has a mirror surface, as the sending prism 12. The prism 38 is mounted upon a suitable standard 39, and its rotation is effected by a suitable motor 40, the armature of which meshes with a gear 41 mounted upon the prism.

Between the elevated rotatable prism 38 and the mirror surfaces 37 of the electro-magnet armature is mounted an opaque screen 42 provided with a slot 43 parallel to the axis of the prism 38. The arrangement of this slot in the screen is such with respect to the prism 38 and the mirror surfaces of the electro-magnet 34 that when the electro-magnets are not energized, light rays from the source of light 36 are not reflected through the slot 43. However, on energizing any one of the electromagnets, its armature is drawn back to a degree depending upon the strength of the energizing current and the angular position of the mirror surface 37 is slightly varied so that a portion or all of the light passing to said surface from the light source 36 is caused to pass through the slot 43 to the mirror side of the prism 38 at that moment in proper position to receive the projected ray of light. A screen, or if desired a transparency 44 is located in a suitable position to receive the rays of light projected through the slot 43 of the opaque screen 42 against the mirror sides of the prism 38 and reflected therefrom.

The prism 38 is constantly rotated at a rate synchronous with the rate of rotation of the similar prism 12 of the sending apparatus. As a result of the rotation of this prism, and of the time elements in the energizing of the several electro-magnets 34, the energizing of any of these magnets will produce a narrow illuminated point or line upon the screen 44. The width of this line or point will be determined by the width of the several mirror surfaces upon the armatures of the electro-magnets 34, which may be for example, ⅛ of an inch.

It is readily apparent that when the individual electro-magnets of the receiving mechanism illustrated in Fig. 5 are energized in accordance with impulses proceeding from the identically located light responsive devices of the sending apparatus of Fig. 1, they will cause the projection upon the screen 44 of an illuminated image substantially a replica of that thrown upon the transparency 11 of the sending device, it being assumed that the rotating mirror prisms of the sending and the receiving device are synchronized. This synchronizing may readily be effected by varying the speed of the prism of the receiving device to secure the proper location of the image upon the receiving screen.

The energizing of the several electro-magnets of the receiving device may be effected by any suitable device, for example, that illustrated in Fig. 7 of the drawings.

The wireless receiving circuit illustrated in Fig. 7 is intended to operate in connection with the sending circuit illustrated in Fig. 4. The Hertzian waves emitted from each of the separately energized aerials 32 of the sending circuit is received upon a tuned aerial 45 and transmitted through the grid circuit of a regenerative amplifier of the same type as that used in the sending system. A suitable interrupter 47 and condenser 48 are interposed in this circuit and a variable condenser 49 may be shunted across the aerial, the interrupter being utilized to reduce the frequency of variations of the current. The filament may be heated in the usual manner by an independent heating circuit 50. The plate circuit of the amplifier is completed through a battery 51 and the primary of a transformer 52. The regenerative grid is connected to the plate circuit through a condenser 53, a suitable high resistance leak 54 being shunted across the condenser. The secondary of the transformer 52 is connected with the coil of the electro-magnet 34 to energize the latter. The receiving circuit for each of the electro-magnets 34 is tuned to receive only the wave emitted by the sending circuit of the corresponding positioned selenium cell 18 of the sending mechanism.

The rate of rotation of the prism 38 of the receiving apparatus, which is synchronized with the similar of the sending apparatus, may readily be made sufficiently rapid that the illusion of a stationarily positioned image upon the screen 44 is produced. Furthermore, if the projected picture at the sending apparatus has motion, the image projected upon the screen 44 of the receiving mechanism will likewise reproduce this motion.

Degrees of light and shade will likewise be reproduced by the receiving apparatus. The electro-magnet 34 will be sensitive to the strength of currents emitted by the individual light responsive cells of the sending apparatus, and the varying strengths of current will cause them to attract their armatures with greater or less force. If the attractive force is light, only a small portion of the mirror surface attached to the armature of the electro-magnet will reflect light upon the mirror face of the prism 38, whereas a stronger attractive force will cause a greater area of light to be reflected thereupon. The varying areas of light reflected upon the mirror surfaces of the prism 38 will produce varying degrees of light or shade upon the screen at the specific area of the screen affected.

It is readily apparent that in the sending mechanism the scene or picture transmitted may, instead of being projected upon a transparency 11, be formed directly upon the transparency itself, and be illuminated from the rear by a suitable source of light. It is furthermore apparent that the specific details of apparatus and process of the receiving and transmitting mechanism, as well as of the various electro-magnet circuits employed are intended merely to illustrate the invention and to set forth an embodiment thereof, but that these various specific details of construction and operation are not intended as limitations upon the scope of the invention itself, except in so far as included in the accompanying claims.

I claim:

1. The process of reproducing pictures, etc., which consists in analyzing the picture to be projected in component parts of definite area, successively projecting linearly aligned groups of said component parts upon corresponding linearly-aligned definite areas of a stationary screen and rapidly repeating the succession of projections.

2. The process of transmitting pictures, etc., which consists in projecting light rays successively from linearly aligned areas of a picture or the like upon a group of light responsive devices, transmitting energy impulses from said light responsive devices to corresponding light projecting devices, and directing the light projected by said devices against linearly aligned areas of a stationary screen in a succession corresponding to the succession of projections of light rays from the picture transmitted.

3. The process of transmitting pictures, etc., which consists in projecting light rays successively from linearly aligned areas of a picture or the like upon a group of light responsive devices, rapidly repeating the succession of reproductions, transmitting energy impulses from said light responsive devices to corresponding light projecting devices, directing the light projected by said devices against linearly aligned areas of a stationary screen in a rapidly repeated succession corresponding to the rapidly repeated succession of projections of light rays from the picture transmitted.

4. In a transmitting device, linearly aligned light responsive devices capable of producing energy impulses, means for projecting rays of light to form a picture, a rotatable prism having axially parallel mirror faces adapted to receive rays of light forming definite areas of the picture and reflect them upon said light responsive device and an opaque screen inserted between the mirror prism and the light responsive device having a linear slot adapted to limit the area reflected upon said device, the slot and the light responsive devices being arranged parallel to the axis of the mirror prism.

5. In combination, a stationary screen, means for reflecting light rays upon definite areas of the screen in succession, a mirror arranged to direct light rays toward said reflecting means, an opaque screen between the mirror and the reflecting means, said screen being provided with a slot and normally obstructing the passage of light rays from the mirror to the reflecting means, and means actuated by energy impulses to move the mirror to direct light through the slot of the screen to the reflecting means.

6. In combination, a stationary screen, means for reflecting light rays upon definite areas of the screen in succession, an electromagnet, a mirror mounted upon the armature of said electro-magnet to direct light rays toward said reflecting means, an opaque screen between the mirror and the reflecting means, said screen being provided with a slot and normally obstructing the passage of light rays to the reflecting means, and said electro-magnet operating when energized to move the mirror to direct light rays through the slot to the reflecting means.

7. In combination, a screen, means for reflecting light rays upon definite areas of the screen in succession, a plurality of mirrors, each arranged to direct light rays toward said reflecting means, an opaque screen between the mirrors and the reflecting means, said opaque screen being provided with a slot, and means actuated by energy impulses for individually moving said mirrors to direct the light rays proceeding therefrom through the slot of the reflecting means.

8. In combination, a screen, means for a repeatedly reflecting light ray upon definite areas of the screen in succession, a plurality of aligned electro-magnets, mirrors mounted upon the armatures of each of said electro-magnets, an opaque screen between said mirrors and the reflecting means, said screen having a slot and normally obstructing the passage of light rays from said mirrors to the reflecting means, and means for individually energizing said electro-magnets to move the mirrors to reflect light rays through the slot to the reflecting means.

9. In combination, a screen, means for reflecting light rays upon definite areas of said screen in succession, means for directing light rays toward said reflecting means, an opaque screen between the light ray directing means and the reflecting means, said screen being provided with a slot and normally obstructing the passage of light to said reflecting means, and means actuated by energizing impulses to cause the light ray directing means to move to direct light through said slot to the reflecting means in quantity variable with the strength of the energy impulses.

10. In combination, a transmitting device, said device comprising a plurality of light responsive devices capable of producing energy impulses, means for directing light rays from linearly aligned areas of a picture in succession upon said light responsive devices to produce energy impulses, and a receiving device comprising a screen, means for reflecting light rays upon linearly aligned areas of said screen in succession, means actuated by energy impulses for projecting linearly aligned light rays upon said reflecting means, and means adapted to receive the energy impulses from the light responsive device of the transmitting device and transmit them to said light ray projecting means.

11. In combination, a transmitting device comprising a plurality of light responsive devices capable of producing energy impulses, means for projecting rays of light to form a picture, a movable mirror adapted to receive rays of light from said picture, means for moving said mirror to successively reflect light rays from definite limited areas of the picture upon the light responsive devices, and an opaque screen interposed between the prism and the light responsive devices, said screen being provided with a slot adapted to limit the area reflected upon said devices, means for separately transmitting the impulses from the individual light responsive devices, and receiving means, said receiving means comprising a screen, a plurality of electro-magnets, mirrors mounted upon the armatures of said electro-magnets, a movable mirror adapted to receive light rays reflected from said mirrors and to reflect said light rays upon definite areas of said screen in succession, an opaque screen mounted between the electro-magnet mirrors and the movable mirror, said screen being provided with a slot and normally obstructing the passage of said rays, means for projecting light rays against the electro-magnet mirrors, and means for separately receiving the energy impulses transmitted from the definite light responsive device of the transmitting device, and for transmitting said impulses to the individual electro-magnets of the receiving means to thereby actuate the electro-magnet mirrors to project light rays through the slot in the screen against the movable mirror.

HENRY K. SANDELL.